US 6,693,874 B1

(12) United States Patent
Shaffer et al.

(10) Patent No.: US 6,693,874 B1
(45) Date of Patent: *Feb. 17, 2004

(54) SYSTEM AND METHOD FOR ENABLING FAULT TOLERANT H.323 SYSTEMS

(75) Inventors: Shmuel Shaffer, Palo Alto, CA (US); Uzi Shalev, Reut (IL); Naomi Frid Ruppin, Herzelia (IL); William J. Beyda, Cupertino, CA (US)

(73) Assignee: Siemens Information & Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/320,825

(22) Filed: May 26, 1999

(51) Int. Cl.$^7$ ................................................ H04L 1/22
(52) U.S. Cl. ................................................ 370/217; 714/7
(58) Field of Search ................................ 370/219, 217; 379/265.11; 714/7, 11

(56) References Cited

U.S. PATENT DOCUMENTS

| | | | | | |
|---|---|---|---|---|---|
| 4,692,918 A | * | 9/1987 | Elliott et al. | ................ | 370/401 |
| 5,016,244 A | * | 5/1991 | Massey et al. | ................ | 370/217 |
| 5,473,599 A | * | 12/1995 | Li et al. | ................ | 370/219 |
| 5,517,563 A | | 5/1996 | Norell | ................ | 379/220 |
| 5,870,565 A | * | 2/1999 | Glitho | ................ | 709/249 |
| 6,181,929 B1 | * | 1/2001 | Korinek et al. | ................ | 455/423 |
| 6,195,705 B1 | * | 2/2001 | Leung | ................ | 370/331 |
| 6,229,804 B1 | * | 5/2001 | Mortsolf et al. | ................ | 370/352 |
| 6,272,386 B1 | * | 8/2001 | McLaughlin et al. | ................ | 700/82 |
| 6,373,857 B1 | * | 4/2002 | Ma | ................ | 370/395.2 |
| 6,374,302 B1 | | 4/2002 | Galasso et al. | | |
| 6,400,685 B1 | * | 6/2002 | Park | ................ | 370/232 |

FOREIGN PATENT DOCUMENTS

| EP | 0 463 215 A1 | 6/1990 | |
|---|---|---|---|
| EP | 1 056 254 A | 11/2000 | |
| EP | 1056256 A2 | * 11/2000 | ........... H04L/29/06 |

OTHER PUBLICATIONS

Derryberry, "Performance Analysis of a Fault–Tolerant, Distributed Multimedia Server" Proceedings of the Spie, Spie, Bellingham, VA, vol. 3539, pp. 61–68, 1998.

Sengodan, "A Gatekeeper Discovery Mechanism for H.323 Systems" Proceedings of the Spie, Spie, Bellingham, VA, Vol 3528, pp. 319–326, 1999.

Toga, et al., "ITU–T Standardization Activities for Interactive Multimedia Communications for Packet–Based Networks: H.323 and Related Recommendations" Computer Networks and ISDN Systems, North Holland Publishing, Amsterdam, NL, vol. 31, No., 11 Feb., 1999, pp 205–223.

* cited by examiner

Primary Examiner—Hassan Kizou
Assistant Examiner—Dmitry Levitan

(57) ABSTRACT

An H.323 client terminal (102) according to an embodiment of the invention employs primary and secondary H.323 control units or state machines (110a, 110b). The primary control unit (110a) sends signaling messages to a primary gatekeeper (108a) and triggers the secondary control unit (110b) to send a message with an appropriate correlation identifier to a secondary gatekeeper (108b). The primary control unit (110a) establishes a call per standard H.323 protocols. The secondary control unit (110b) also establishes a call via a secondary gatekeeper (108b). However, no media channels are established for this back up call. As the secondary control unit (110b) receives signaling from the secondary gatekeeper (108b), it checks the status of the call with the primary control unit (110a). If the call signaling on the primary control unit (110a) is proceeding normally, no further action is taken. If the call signaling with the primary gatekeeper (108a) fails, the secondary control unit (110b) takes over communication.

23 Claims, 9 Drawing Sheets

SYSTEM AND METHOD FOR ENABLING FAULT TOLERANT H.323 SYSTEMS

BACKGROUND OF THE INVENTION

1. Field of the Invention

The present invention relates to telecommunications systems and, particularly, to an improved fault tolerant H.323 system.

2. Description of the Related Art

The International Telecommunications Union (ITU) Recommendation H.323 describes a set of devices and protocols for multimedia communication over packet-switched networks. The four main components defined by the specification are clients (also referred to as terminals or endpoints), multipoint control units, gateways and gatekeepers.

The H.323 Recommendation provides for separate H.225.0 call signaling, H.245 call control and media channels. Typically, H.225.0 call signaling and H.245 call control are routed through the gatekeeper, while the media channels (i.e., audio, data and/or video) are routed directly between the endpoints. For example, to place a call between two clients, the calling party client sends a message to a gatekeeper, which resolves the address of the receiving party and sends the appropriate signaling messages to the caller and receiver. Once the signaling and control channels have been established, the endpoints establish the media channels. There may be more than one media channel for a call, such as two unidirectional channels for an audio call. The H.225.0 signaling channel and the H.245 call control channel are also used to terminate the call.

If the gatekeeper fails for any reason, the endpoints become aware of the situation because their connection to the gatekeeper (usually seen in the client as a TCP socket) will close. When the H.245 control channel is detected as having been closed, the H.323 Recommendation requires the endpoints to disconnect the call and close the media channel(s). This requirement exists so that when the gatekeeper does recover, there are no outstanding media connections still alive of which the gatekeeper is unaware. Thus, the network is prevented from perpetually maintaining a call. When a bandwidth policy is employed, the network is prevented from allowing more calls than the network can handle.

While redundant back-up gatekeepers which track other gatekeepers' operations have been known to be provided, such systems do not allow for preservation of ongoing calls. In these cases, ongoing calls are lost and the H.323 client terminals must re-register and re-initiate call setup again, which can cause a burst of excessive load on the network and on the gatekeeper. Moreover, gatekeeper to gatekeeper communication can consume processing power and load the system.

SUMMARY OF THE INVENTION

These disadvantages in the prior art are overcome in large part by a system and method according to the present invention. In particular, H.323 client terminals according to the present invention include redundancy supervisory layers which provide redundant H.225.0 call signaling and H.245 call control to secondary gatekeepers. The secondary gatekeepers respond as if they were the primary gatekeeper, but the H.323 client terminals do not set up media channels as part of the call setup via the secondary gatekeepers. If the primary gatekeeper fails, the media channel(s) is maintained, and the redundancy supervisory layers know that the call signaling and call control channels are to be handled through the secondary gatekeeper.

An H.323 client terminal according to an embodiment of the invention employs primary and secondary H.323 control units or state machines. The H.323 client terminal registers with both a primary and a secondary gatekeeper. The primary control unit sends signaling messages to a primary gatekeeper and triggers the secondary control unit to send messages with the appropriate call identifier to a secondary gatekeeper. The primary control unit establishes a call per standard H.323 protocols. As the secondary control unit receives signaling from the secondary gatekeeper, the secondary control unit checks the status of the call with the primary control unit. If the call signaling on the primary control unit is active, no further action is taken by the secondary control unit once the secondary call is established. If the call signaling with the primary gatekeeper fails, the secondary control unit takes over communication.

A better understanding of the invention is obtained when the following detailed description is considered in conjunction with the following drawings.

DETAILED DESCRIPTION OF THE INVENTION

Figure 1:
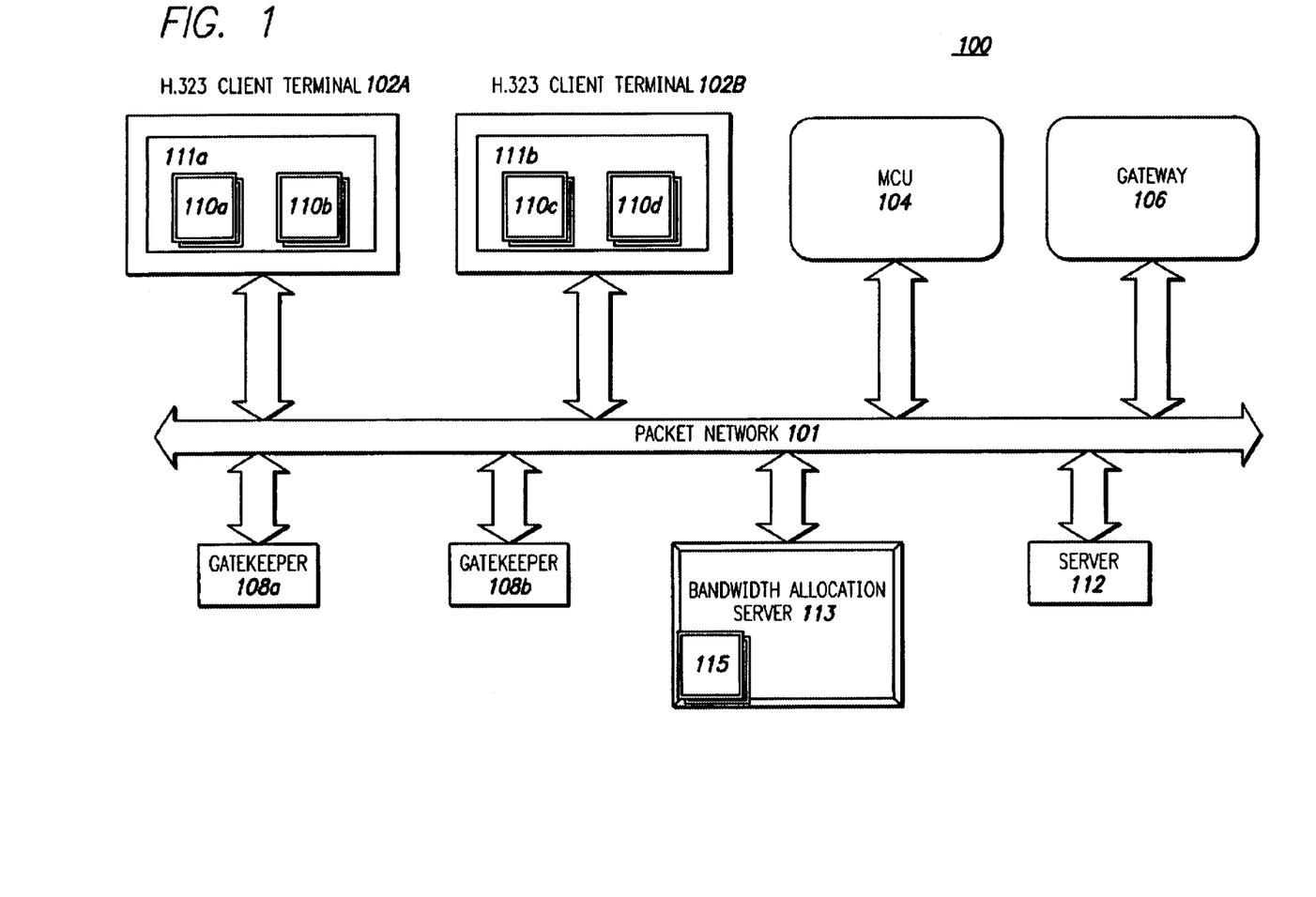
FIG. 1 is a diagram illustrating an H.323 system according to an embodiment of the invention.

Turning now to the drawings, and with particular attention to FIG. 1, a diagram illustrating an exemplary H.323 telecommunications system 100 according to an embodiment of the present invention is shown. It is noted that, while described herein with regard to an H.323 network, the invention is equally applicable to any network in which separate media and signaling channels are used, such as MGCP (Media Gateway Control Protocol), SIP+ (Inter MGS Protocol), SGCP (Simple Gateway Control Protocol), MEGACO (Media Gateway Control), and generally, any voice or multimedia over IP scheme. Further, it is noted that, while described specifically in the context of voice packets, the present invention encompasses the use of any multimedia information, such as video, data, voice, or any combinations thereof. Finally, it is noted that an exemplary H.323 system is the HiNet198 RC 3000 system, available from Siemens.

The telecommunications system 100 includes a local area network (LAN) or packet network 101. Coupled to the LAN 101 may be a variety of H.323 terminals 102a, 102b, a multi-point control unit (MCU) 104, an H.323 gateway 106, a primary H.323 gatekeeper 108a, a secondary H.323 gatekeeper 108b, a LAN server 112, a bandwidth allocation server 113 and a plurality of other devices such as personal computers (not shown). The H.323 terminals 102a, 102b are in compliance with the H.323 Recommendation. Thus, the H.323 terminals 102a, 102b support H.245 control signaling for negotiation of media channel usage, Q.931 (H.225.0) for call signaling and call setup, H.225.0 Registration, Admission and Status (PAS), and RTP/RTCP (Real Time Protocol/ Real Time Control Protocol) for sequencing audio and video packets. The H.323 terminals 102a, 102b may further implement audio and video codecs, T.120 data conferencing protocols and MCU capabilities. Further details concerning the H.323 Recommendation may be obtained from the International Telecommunications Union; the H.323 Recommendation is hereby incorporated by reference in its entirety as if fully set forth herein.

Further, the H.323 terminals 102a, 102b include redundancy control units (also referred to as "redundancy supervisory layers") 111a, 111b, each of which includes a primary and secondary control unit 110a, 110b and 110c, 110d, respectively (typically embodied as coupled state machines), according to the present invention. The redundancy control units 111a, 111b function to provide H.323 signaling to the primary and secondary gatekeepers, 108a and 108b, respectively. The redundancy control units 111a, 111b and the primary and secondary gatekeepers 108a, 108b function to provide a system with two signaling channels but a single media or payload channel(s) allocated only for the primary connection, as will be discussed in greater detail below.

In addition, a bandwidth allocation server or manager 113 may be provided, including a redundant allocation layer 115 according to the invention. As will be discussed in greater detail below, the redundant allocation layer 115 associates system bandwidth across two calls when primary and secondary signaling and control paths are established according to the present invention. Other servers, such as billing servers, which are not specifically described, may operate in a similar manner (e.g., to prevent duplication of services such as charges based on the dual signaling).

Figure 2A:
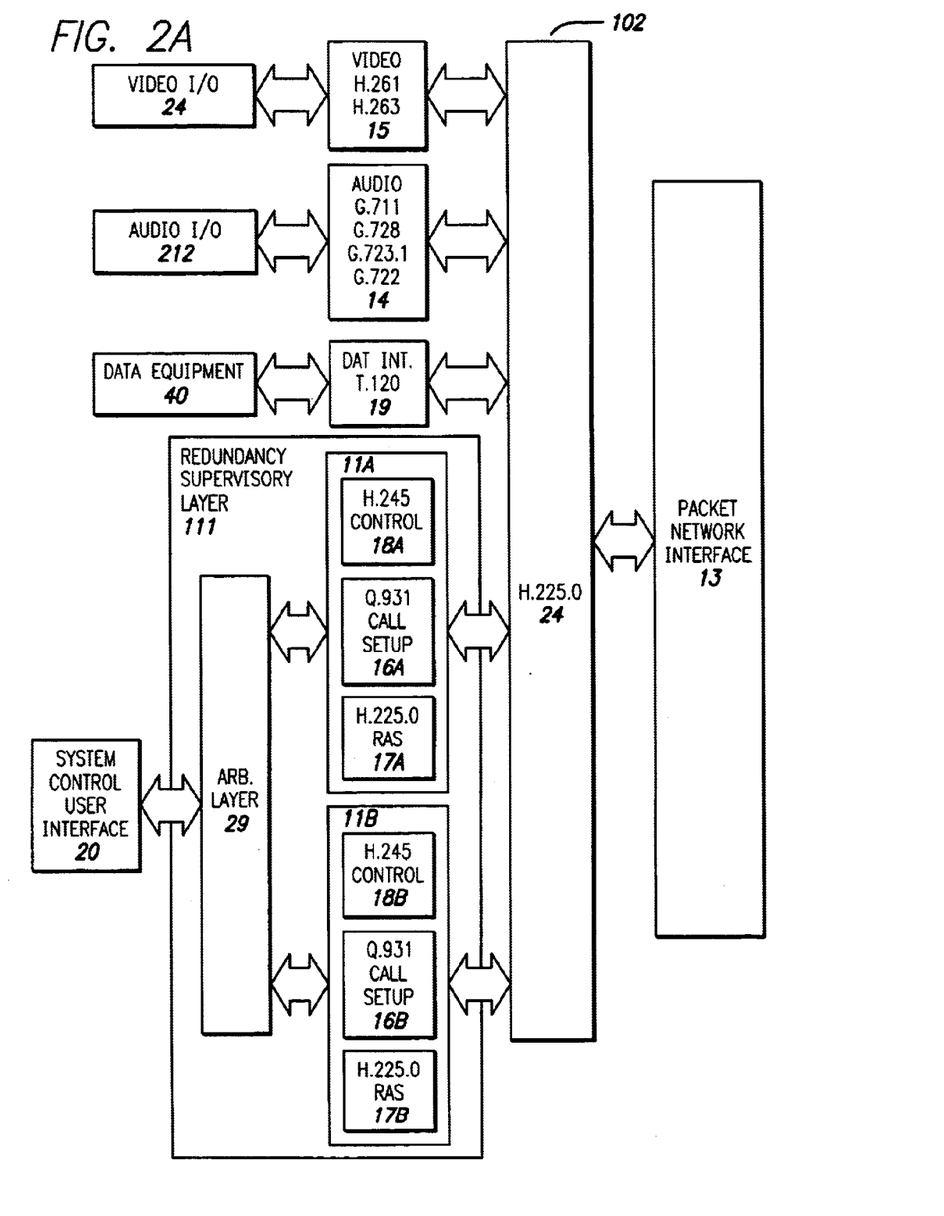
FIGS. 2A–2C are diagrams illustrating an H.323 terminal with a redundancy supervisory layer according to an embodiment of the invention.

In accordance with a specific embodiment of the present invention, FIG. 2A illustrates a logical diagram of an H.323 interface to the LAN 101. It is noted that, while illustrated in network layer format, typically, the redundancy supervisory layer 111 is implemented as one or more coupled state machines capable of supporting the H.323 protocol. The interface includes a network terminal/device 102 including a redundancy supervisory layer 111 according to the present invention and a packet network interface 13 that is coupled to the network terminal 102. As will be discussed in greater detail below, the network terminal 102 utilizes the ITU-T H.323 Recommendation protocol. The network interface 13 couples the network terminal 102 to the LAN 101. H.323 terminals/devices and equipment carry real-time voice, video and/or data. It should be noted that H.323 recommendation is an umbrella recommendation that provides for multimedia communications, including telephony-over-LAN communications. The network can include packet-switched Transmission Control Protocol/Internet Protocol (TCP/IP) and Internet Packet Exchange (IPX) over Ethernet, Fast Ethernet and Token Ring networks.

The H.323 terminal 102 is coupled to a video input/output (I/O) interface 24, an audio I/O interface 212, a data equipment interface 40, and a system control user interface (SCUI) 20. The network terminal 102 further includes an H.225.0 layer 24, an audio coder/decoder (codec) 14, and may include a video codec 15, and a T.120 data interface layer 19. The audio I/O interface or card 212, which may be part of the standard H.323 device, connects to the audio codec 14, such as a G.711 codec, for encoding and decoding audio signals. The audio codec 14 coupled to the H.225.0 layer 24 encodes audio signals for transmission and decodes received signals. Although the G.711 codec is the mandatory audio codec for an H.323 terminal, other audio codecs, such as G.728, G.729, G.723.1, G.722, and MPEG1 audio may also be used for encoding and decoding speech. G.723.1 is a preferred codec because of its reasonably low bit rate, which enables preservation of link bandwidth, particularly in slower speed network connections.

The video I/O interface or card 28, which may be part of the standard H.323 device, connects to a video codec 15, such as an H.261 codec for encoding and decoding video signals. The video codec 15 encodes video signals for transmission and decodes received signals. H.261 is the mandatory codec for H.323 terminals that support video, though other codecs such as H.263 may be supported.

The system control user interface (SCUI) 20 provides signaling and flow control for proper operation of the H.323 terminal 102. In particular, call signaling and control are handled by the SCUI 20. A redundancy supervisory layer 111 according to the present invention is coupled to the SCUI 20. The redundancy supervisory layer 111 according to the present invention includes a pair of control layers 11a, 11b, and an arbitration layer 29. The control layers 11a, 11b are standard H.323 control layers and thus include Q.931 layers 16a, 16b, H.225.0 RAS layers 17a, 17b, and H.245 layers 18a, 18b. Thus, the SCUI 20 interfaces via the arbitration layer 29 to the H.245 layer 18 which is the media control protocol that allows capability exchange, opening and closing of logical channels, mode preference requests, flow control messages and other miscellaneous commands and indications. The SCUI 20 also interfaces via the arbitration layer 29 to the Q.931 protocol which defines the setup, teardown, and control of H.323 communication sessions. The SCUI 20 further interfaces via the arbitration layer 29 to the H.225.0 Registration, Admission and Status (RAS) protocol that defines how H.323 entities can access H.323 gatekeepers to perform, among other things, address translation, thereby allowing H.323 endpoints to locate other H.323 endpoints via an H.323 gatekeeper. The H.225.0 layer 24, which is derived from Q.931 layer 16a, 16b, is the protocol for establishing a connection among two or more terminals and also formats the transmitted video, audio, data, signaling and control streams into messages for communication via the network interface 13 (e.g., packet network 101). The H.225.0 layer 24 also retrieves the received video, audio, data, signaling and control streams from messages that have been input from the network interface, routes the signaling and control information to the appropriate control layer 11a, 11b and routes media streams to the appropriate audio, video and data interfaces.

Thus, an H.323 network may be configured to include several different devices. For example, the network may include a terminal for enabling a user connected to a LAN to communicate with another user on the LAN, a terminal for enabling a caller resident on the LAN to call a second party in the public switched network and/or a terminal for enabling an adapter to communicate through a wireless trunk, using a wireless telephone. The device may also implement supplementary services according to the H.450.X Recommendations.

The arbitration layer 29 according to the present invention provides a single signaling flow to the SCUI 20. If both control layers 11a, 11b are functioning, the arbitration layer 29 selects the primary control state machine or control layer. If either control layer 11a, 11b is down, because the related gatekeeper is down, the arbitration layer 29 selects the other operational state machine or control layer to control a call. This is illustrated schematically in FIGS. 2B and 2C.

Figure 2B:
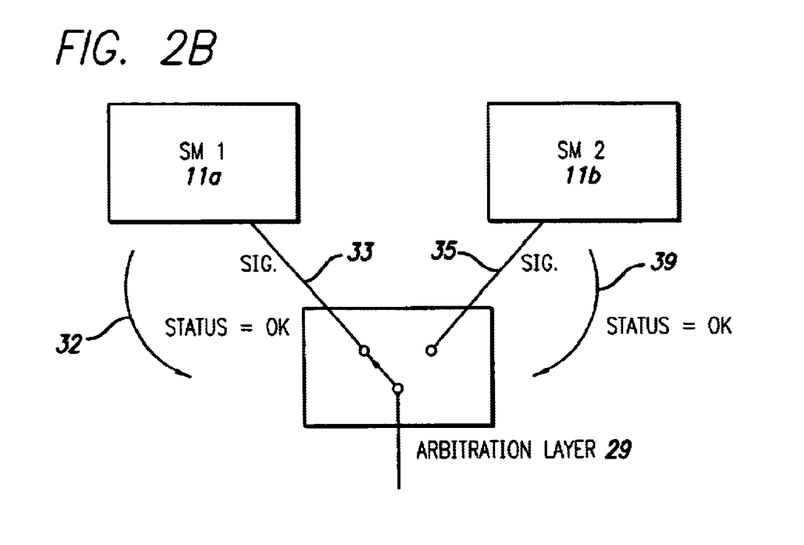

The arbitration layer 29 of FIG. 2B receives H.225.0 call signaling and H.245 control signaling along lines 33, 35 from the primary and secondary state machines SM1, SM2. The arbitration layer 29 further receives status signals along lines 37, 39 from the state machines SM1, SM2, indicative of whether they (and hence the gatekeepers from which they are receiving signaling) are up and functioning. Assuming both state machines are active, the arbitration layer 29 selects to receive and transmit to the SCUI 20 the H.225.0 and H.245 signaling from the primary state machine SM1. It is noted that references to "primary" and "secondary" state machines or control layers is somewhat arbitrary; either state machine could be the primary one.

Figure 2C:
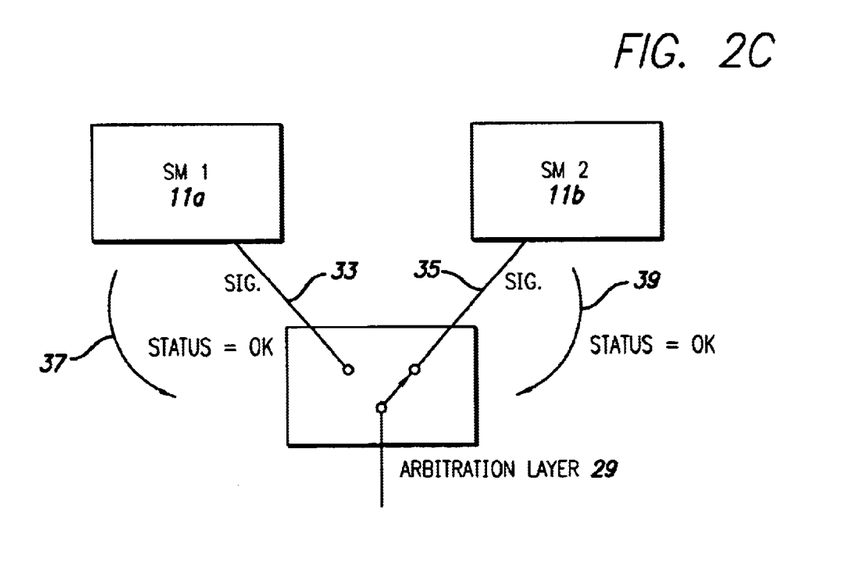

FIG. 2C illustrates the situation in which the primary state machine SM1 has failed, because the gatekeeper from which it had been receiving signaling had failed. In this case, the arbitration layer 29 reads the status signal along line 37 and switches to receive H.225.0 and H.245 signaling from the state machine SM2, from which an active status signal had been received, along line 39.

Furthermore, the terminal 102 shown in FIG. 2A is capable of functioning in an environment in which only a few of the terminals are similarly equipped. That is, not all of the H.323 client endpoints need be equipped with redundancy supervisory layers 111 including primary and secondary state machines. The availability of the redundancy supervisory layer 111 is determined during call set up. It is utilized only if both clients are so equipped. If only one client is so equipped, the system defaults to a normal, non-redundant operation, using state machine SM1 (11a). Thus, the present invention advantageously permits redundancy and fault tolerance to be assigned among only selected clients or groups of clients within a system.

Figure 3:
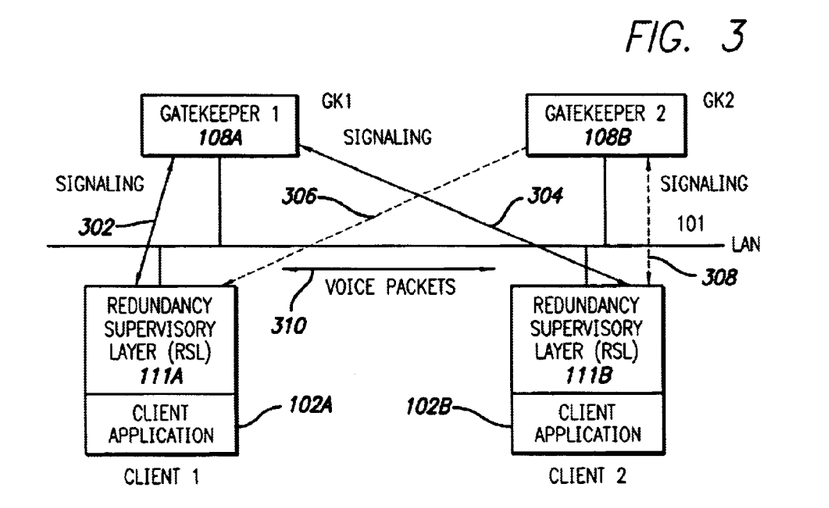
FIG. 3 is a diagram illustrating signaling flow according to an embodiment of the invention.

FIG. 3 illustrates the signaling for operation of an embodiment of the invention. It is noted that while the signal paths are shown as direct connections, typically, signaling is conducted via the LAN. As shown, a pair of gatekeepers, GK 1 and GK 2, and a pair of client terminals or endpoints Client 1 and Client 2 are connected to the LAN 101. The endpoints Client 1 and Client 2 include redundancy supervisory layers 111a, 111b, according to the present invention, as well as client applications 102a, 102b. It is noted that while the gatekeepers GK 1 and GK 2 may be identical, or may use the same operating system, in certain instances, it may be preferable to use primary and secondary gatekeepers which employ different operating systems, or even come from different vendors, to prevent both gatekeepers from crashing simultaneously from a common software or condition fault. The present invention is capable of operating in such an environment, because the redundancy is maintained by the client terminals, not the gatekeepers themselves.

If Client 1 initiates a call to Client 2, it sends an H.225.0 Setup message, including a globally unique call identifier (GUId), to its primary gatekeeper GK 1 along signaling path 302. The H.323 call setup also includes a capability exchange to allow the endpoints to determine that a redundancy supervisory layer is available at both ends.

In response to the received H.225.0 Setup message, the gatekeeper GK 1 sends an H.225.0 Setup message to the endpoint Client 2 along signaling path 304. Client 2 responds along the signaling path 304 and the call is set up in the standard fashion. The media channel 310 is then established directly between the endpoints. Once the primary call is established, an H.225.0 Setup message is sent to the secondary gatekeeper GK 2 along signaling path 306. It is noted that the establishment of the secondary signaling path is initiated only after the primary call is established and it has been allocated bandwidth for its media (payload) channel(s). The gatekeeper GK 2 then sends an H.225.0 Setup message to the endpoint Client 2 along signaling path 308. This occurs after the capability exchange of the first call setup has been completed and the endpoints know that redundancy supervisory layers are available at both endpoints. The H.225.0 Setup message contains the same globally unique call identifier (GUId) as the first H.225.0 Setup message for the primary call. Alternatively, the GUId's could be related according to a predetermined algorithm, such as sequentially, so long as the Client 2 can recognize the call set up being received as being redundant. The endpoint Client 2 recognizes the GUId as identifying a backup signaling connection and accepts it. However, the endpoint Clients 1 and 2 will not open any logical media channels in response to this second call setup (i.e., a separate media payload channel will not be established). Due to the existence of the redundancy supervisory layers and their associated arbitration layers 29, the Client Applications are presented with only a single signaling channel and a single stream of media (e.g., voice) packets. The Client Applications are not aware of whether the primary or secondary gatekeeper is being used to control signaling.

If gatekeeper GK 1 (the primary gatekeeper) stays up during the entire call, when one of the users disconnects, the users endpoint client sends a standard clearing message to the gatekeepers GK 1 and GK 2. The gatekeeper GK 1 terminates the call by sending clearing messages to the other endpoint client and closing the signaling channel. The gatekeeper GK 2 sends the same clearing messages and the secondary signaling channels are also closed. The redundancy supervisory layer 111a, 111b in each endpoint performs the termination function (and any related features). The arbitration layer 29 passes the clearing information from the primary state machine or control layer to the Client Application via the SCUI 20. The arbitration layer 29 ensures that the secondary state machine closes its signaling and control channels properly, as well.

If the gatekeeper GK 1 fails during the call, its signaling channel (along paths 302, 304) between the endpoints Client 1 and Client 2 is lost. The failure of the gatekeeper GK 1 is recognized at the endpoints, for example, as a TCP socket closing. According to the present invention, the media or payload channel 310 is maintained and the secondary signaling channel through the gatekeeper GK 2 (along paths 306, 308) is used. While the gatekeeper GK 1 is out of service, any of the gatekeeper's endpoints equipped with the redundancy supervisory layer 111 trying to use the gatekeeper GK 1, will be switched to the gatekeeper GK 2 as the arbitration layers and the redundancy supervisory layers recognize the failure of the gatekeeper GK 1. It is noted that more than two gatekeepers (and hence, more than two state machines or control layers within the redundancy supervisory layer 111) could be used. Thus, the figures are exemplary only.

Figure 4A:
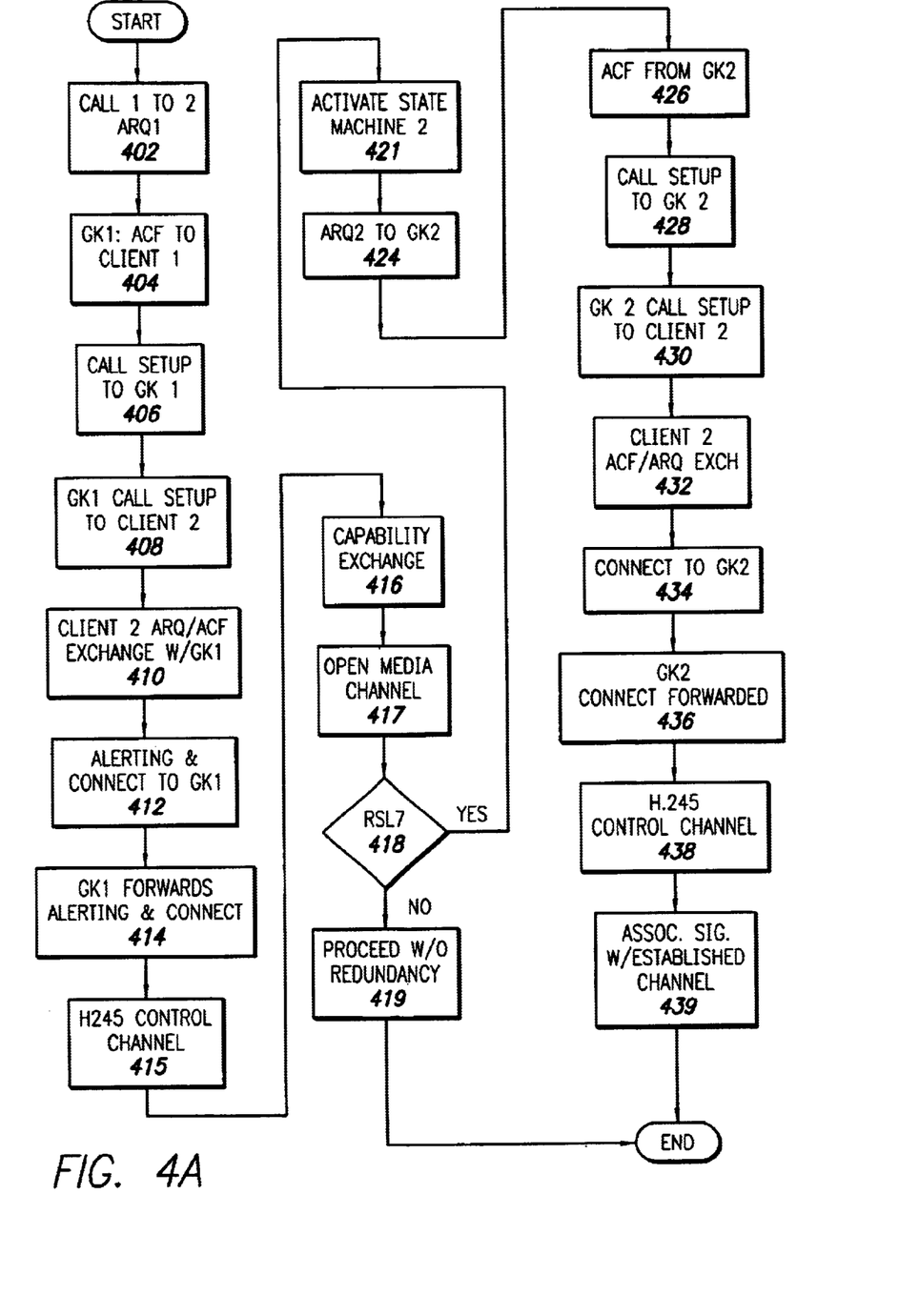
FIGS. 4A–4C are flowcharts illustrating system operation according to an embodiment of the invention.
Figure 4B:
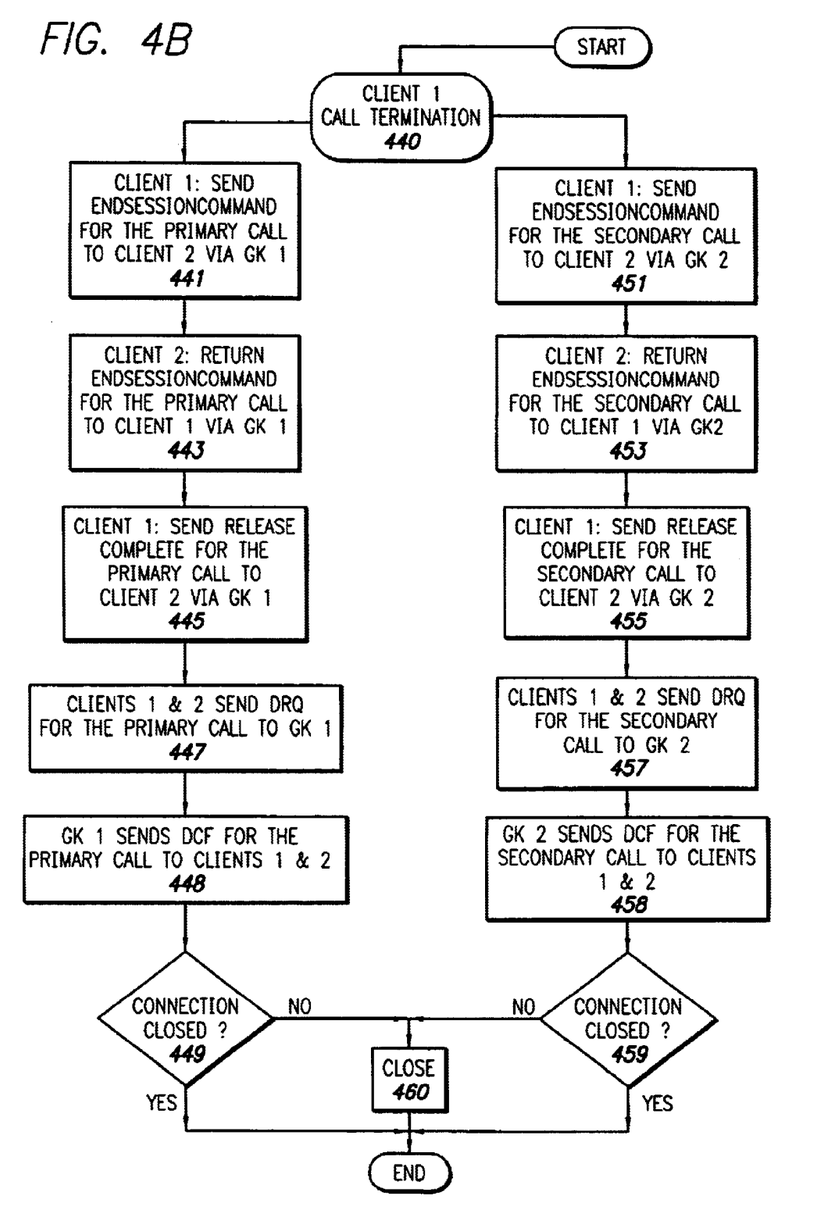
Figures 4C, 6C:
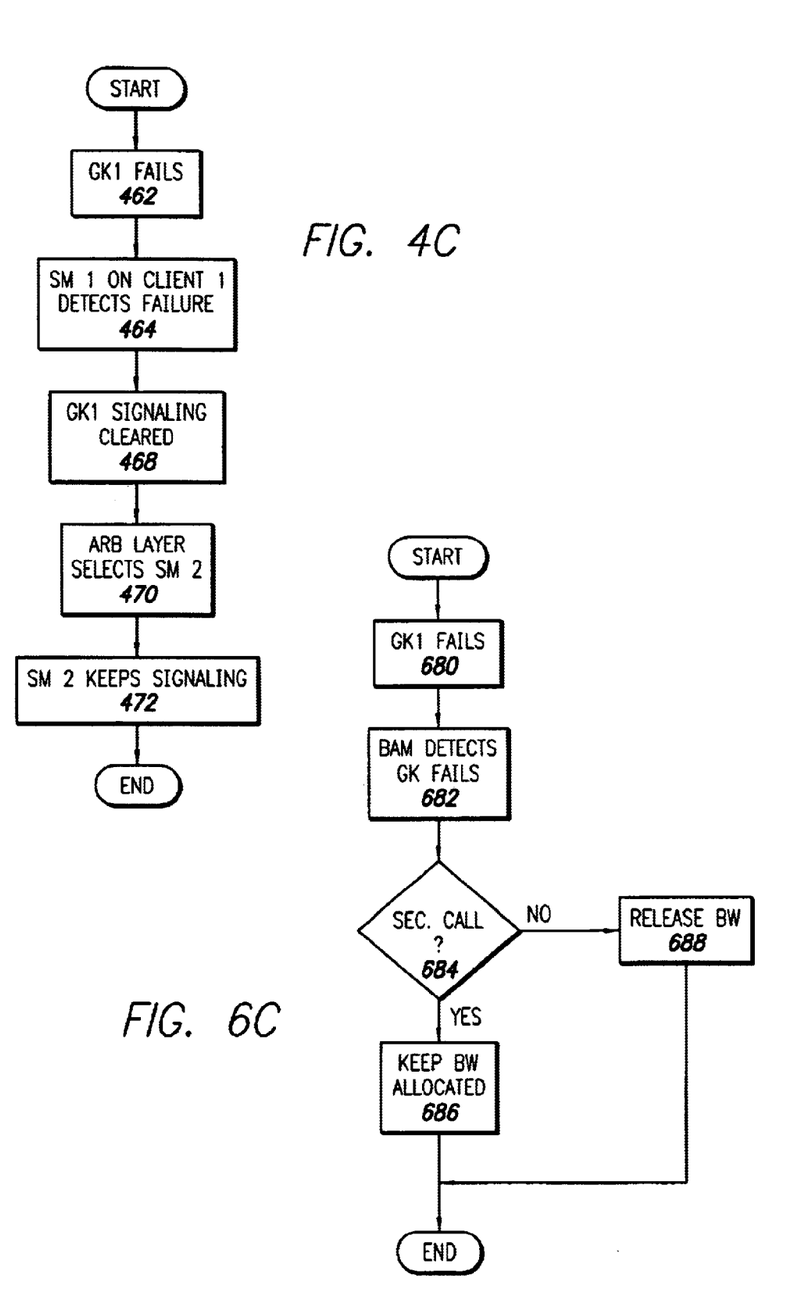
FIGS. 6A–6C are flowcharts illustrating system operation according to the embodiment of FIG. 5.

Operation of this embodiment of the invention is illustrated more clearly with reference to the flowcharts of FIGS. 4A–4C. In particular, with reference to FIG. 4A, in a step 402, the endpoint Client 1 wants to establish a call to another endpoint, Client 2. The endpoint Client 1 and, particularly, the primary state machine or primary control unit 110a, sends an ARQ message (AdmissionRequest) to the gatekeeper GK 1. Assuming the gatekeeper GK 1 is functioning, the gatekeeper GK 1 responds with an ACF (AdmissionConfirm) message to Client 1, in a step 404, which is received by the primary state machine 110a. The ACF message includes a Call Signaling Transport Channel Address of the gatekeeper GK 1. In a step 406, in response to the ACF message, the primary state machine 110a sends an H.225.0 Setup message to the gatekeeper GK 1, including a Globally Unique Call Identifier to identify the call.

In a step 408, the gatekeeper GK 1 relays the H.225.0 Setup message to the endpoint Client 2 and, in particular, its primary state machine or primary control unit 110c. In response, in a step 410, the endpoint Client 2's primary state machine 110c conducts an ARQ/ACF exchange with the gatekeeper GK 1. In a step 412, the endpoint Client 2's primary state machine 110c sends an H.225.0 Alerting and Connect message to the gatekeeper GK 1 as the call progresses to the connect state. The gatekeeper GK 1, in turn provides the Alerting and Connect messages to the endpoint Client 1's primary state machine 110a in a step 414. The Alerting or Connect message includes the Gatekeeper H.245 Control Channel Transport Address, which is used, in a step 415, to establish the H.245 control channel. Next, an H.245 capability exchange is undertaken, in a step 416. In a step 417 the media channel is opened between endpoint Client 1 and Client 2. The capability exchange includes exchanges of the coding algorithm to be used, and the like. In addition, according to the present invention, the capability exchange includes an exchange of whether or not each side is equipped with a redundancy supervisory layer 111, a determination which is made in a step 418. If one side is not equipped with a redundancy supervisory layer 111, then in a step 419, the system proceeds with normal call setup without redundancy, and the non-equipped side uses its only state machine as the "primary" state machine. In step 418, if it is established that both sides are equipped with a redundancy supervisory layer, then the primary state machine 110a sends a signal activating the secondary state machine 110b in a step 421.

In a step 424, the secondary state machine 110b sends an ARQ to the gatekeeper GK2, which requests no bandwidth for this secondary call. In a step 426, the secondary state machine 110b receives an ACF message from the gatekeeper GK 2, including the Call Signal Transport Channel Address of the gatekeeper GK 2. In a step 428, the secondary state machine 110b sends an H.225.0 Setup message to the gatekeeper GK 2, using the same globally unique call identifier that the primary state machine 110a used previously with the gatekeeper GK 1. In a step 430, the gatekeeper GK 2 sends the H.225.0 Setup message to the endpoint Client 2 using the same globally unique call identifier as was used on the primary call. The endpoint Client 2 receives the H.225.0 Setup message and determines that it is related to an existing call (the call established in steps 402 through 417). This causes endpoint Client 2's primary state machine 110c to send a signal activating the secondary state machine 110d to process the received H.225.0 Setup message. In response to the H.225.0 Setup message, in a step 432 the endpoint Client 2's secondary state machine 110d and the gatekeeper GK 2 exchange ARQ/ACF messages. In a step 434, the endpoint Client 2's secondary state machine 110d sends a Connect message to the gatekeeper GK 2. This Connect message is forwarded by the gatekeeper GK 2 to the endpoint Client 1 (and, in particular, its secondary state machine 110b) in a step 436. Next, in a step 438, the secondary state machine 110d of the endpoint Client 2 establishes the H.245 control channel with the endpoint Client 1. The endpoint Client 2's secondary state machine 110d recognizes the duplicate nature of the signaling and associates in step 439 this signaling with the media channel that which had been established in step 417.

Turning now to FIG. 4B, a flowchart illustrating the termination process is shown. In a step 440, call termination is initiated at endpoint Client 1. It is noted that the call termination could be initiated from the endpoint Client 2 as well. In a step 441, the endpoint Client 1 (and, in particular, the state machine 110a), for example, initiates call termination by sending an H.245 endSessionCommand to gatekeeper GK 1, which sends the H.245 endSessionCommand on to endpoint Client 2. In a step 443, endpoint Client 2 (and, in particular, the state machine 110c) responds to the received H.245 endSessionCommand by sending its own H.245 endSessionCommand to GK 1, which sends the H.245 endSessionCommand on to endpoint Client 1. In a step 445, endpoint Client 1 sends an H.225.0 Release Complete message to gatekeeper GK 1 to close the call signaling channel, and GK 1 sends the Release Complete message on to endpoint Client 2. Endpoint Clients 1 and 2 then inform gatekeeper GK 1 to release the bandwidth for the primary call by sending Disengage Request (DRQ) messages to GK 1, in a step 447. In a step 448, gatekeeper GK 1 responds to the received DRQ messages by sending endpoint Clients 1 and 2 Disengage Confirm (DCF) messages. In a step 449, the redundancy supervisory layer 111 determines whether the GUId is recognized as belonging to an already closed connection. If so, then the operation of the primary state machine terminates. If in a step 449 it is found that the media channel has not been closed, then in a step 460 the media connection is closed.

Concurrently with closing the primary connection, the secondary connection also needs to be closed. In a step 451, the endpoint Client 1 (and, in particular, the state machine 110b) initiates call termination by sending an H.245 endSessionCommand to gatekeeper GK 2, which sends the H.245 endSessionCommand on to endpoint Client 2. In a step 453, endpoint Client 2 (and, in particular, the state machine 110d) responds to the received H.245 endSessionCommand by sending its own H.245 endSessionCommand to GK 2, which sends the H.245 endSessionCommand on to endpoint Client 1. In a step 455, endpoint Client 1 sends an H.225.0 Release Complete message to gatekeeper GK 2 to close the call signaling channel, and GK 2 sends the Release Complete message on to endpoint Client 2. Endpoint Clients 1 and 2 then inform gatekeeper GK 2 to release the control channel for the secondary call by sending Disengage Request (DRQ) messages to GK 2, in a step 457. In a step 458, gatekeeper GK 2 responds to the received DRQ messages by sending endpoint Clients 1 and 2 Disengage Confirm (DCF) messages. In a step 459, the redundancy supervisory layer 111 determines whether the GUId is recognized as belonging to an already closed connection. If so, then the operation of the secondary state machine terminates. If in a step 459 it is found that the media channel has not been closed, then in a step 460 the media connection is closed.

Turning now to FIG. 4C, a diagram illustrating operation of the system when gatekeeper failure is determined. In particular, in a step 462, the gatekeeper GK 1 fails. It is noted that failure of the gatekeeper GK 1 is by way of example only. The present invention is equally applicable to a failure of gatekeeper GK 2, if the gatekeeper GK 2 were handling the primary call. Next, in a step 464, the primary state machine 110a of the endpoint Client 1 detects the failure of the gatekeeper GK 1, typically as a closed TCP socket. In response, in step 468, the endpoint Client 1's primary state machine 110a clears its gatekeeper GK 1 signaling. However, the secondary state machine 110b maintains its signaling through gatekeeper GK 2. In a step 470, the arbitration layer 29 detects that the primary state machine 110a is down and thus it continues the session by using the secondary state machine 110b. In step 472, the state machine 110b continues to maintain signaling with the gatekeeper GK 2. It is noted that a similar series of steps occurs at the endpoint Client 2.

If, after failure of the primary gatekeeper GK 1, other endpoints that are assigned to the gatekeeper GK 1 as their primary gatekeeper attempt to set up calls, they will still first seek to signal via the gatekeeper GK 1. However, since they receive no response, they will recognize that they are no longer registered with the gatekeeper GK 1, so primary calls will be made through the gatekeeper GK2.

Figure 5:
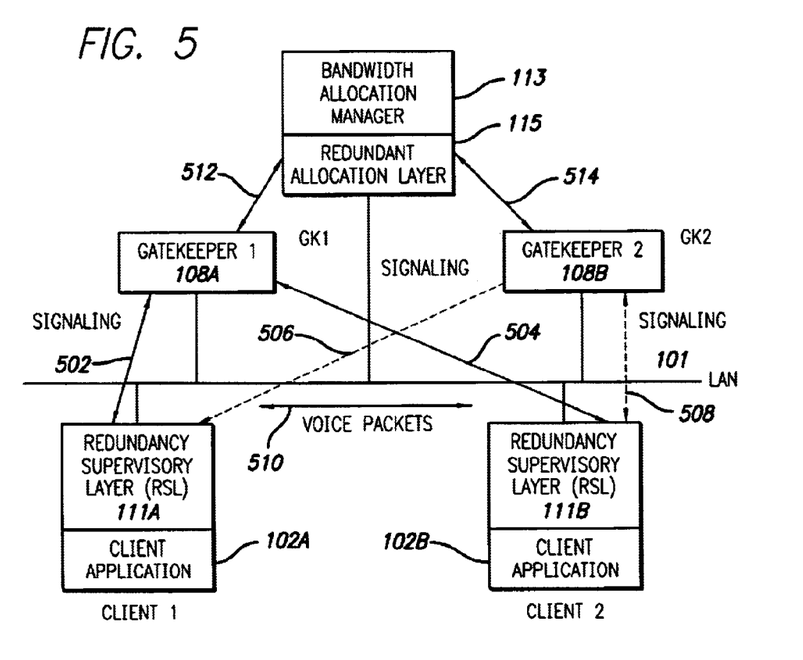
FIG. 5 is a diagram illustrating signaling flow according to another embodiment of the invention.

A further enhancement of the present invention is shown in FIG. 5. In particular, FIG. 5 illustrates a system similar to that shown in FIG. 3, but includes a bandwidth allocation manager (BAM) 113 including a redundant allocation layer 115 according to the present invention. Typically, during call setup, the gatekeeper handling a call would request a particular amount of bandwidth. The bandwidth is then assigned to the call and is no longer available to other users. Since the redundancy supervisory layers 111a, 111b are making two bandwidth requests for each call, bandwidth will be requested for only the first (primary) call. No bandwidth will be requested for the secondary call as only a media channel(s) for one call is actually needed and established. Accordingly, the bandwidth allocation manager 113 and, particularly, the redundant allocation manager 115 identify duplicate call identification numbers (GUIds) and associate the bandwidth of a first (primary) call as applying to a secondary call as well. It is noted that the principles of this embodiment are equally applicable to other types of servers that rely on counting a number of signaling channels before undertaking a particular action. For example, a billing server might count the number of signaling channels and therefore bill a user of the redundancy supervisory layer twice for the same call. The redundancy allocation layer described with reference to FIG. 5 could be used to eliminate the duplicate billing. Thus, FIG. 5 is exemplary only.

As shown in FIG. 5, a pair of gatekeepers, GK 1 and GK 2, a pair of client terminals or endpoints Client 1 and Client 2, and a bandwidth allocation manager 113 are coupled to a LAN. If Client 1 initiates a call to Client 2, it sends an ARQ message to its primary gatekeeper GK 1 along signal path 502. The gatekeeper GK 1 in turn sends a bandwidth allocation request to the bandwidth allocation manager 113 along signal path 512. Assuming the bandwidth is available, the bandwidth allocation manager 113 sends a message to the gatekeeper GK 1 informing it that the bandwidth is available along the path 512.

Gatekeeper GK 1 sends an ACF message to the endpoint Client 1 along path 502 indicating the bandwidth available for this call. Client 1 sends an H.225.0 Setup message to gatekeeper GK 1, and gatekeeper GK 1 then sends the H.225.0 Setup message to Client 2 along path 504. Client 2 recognizes the new call request and the call is set up in the standard fashion and media channel(s) 510 is established. After the first call reaches the connect state, a new call setup is initiated by Client 1 sending an ARQ message to gatekeeper GK 2 along path 506. Since this is known to be a secondary call by Client 1, the ARQ message contains a request for zero bandwidth for this call. Gatekeeper GK 2 responds with an ACF to Client 1 along path 506. Client 1 then sends along path 506 an H.225.0 Setup message to gatekeeper GK 2 containing the same globally unique call identifier (GUId) as was used for the corresponding primary call to Client 2 that was set up through gatekeeper GK 1. The secondary gatekeeper GK 2 sends an indication of the secondary call with its GUId to the bandwidth allocation manager 113 along signaling path 514. The bandwidth allocation manager's redundant allocation layer 115 associates this secondary call to an existing call because it recognizes the GUId that had been provided to it previously. The redundant allocation layer 115 then sends an association acknowledgement to the gatekeeper GK 2 along the signal path 514, but does not actually assign additional bandwidth to the call and thus does not reduce the amount of bandwidth available for other calls.

The gatekeeper GK 2 then sends an H.225.0 Setup message to the endpoint Client 2 along signaling path 508. The H.225.0 Setup message contains the same GUId as the first primary call. Alternatively, the GUId could be related according to a predetermined algorithm, such as sequentially, so long as the endpoint Client 2 and the redundant allocation layer 115 of the bandwidth allocation manager 113 can recognize the call setup being received as being for a redundant call. The endpoint Client 2 recognizes the GUId as identifying a secondary connection and accepts the new call by returning an H.225.0 Connect message to gatekeeper GK 2, which in turn sends the H.225.0 Connect message to endpoint Client 1. However, the endpoint Client 2 will not establish new media channels for this call with endpoint Client 1.

If the gatekeeper GK 1 stays up during the entire call, when one of the users disconnects, for example at Client 1, then endpoint Client 1 sends clearing messages to the gatekeepers GK 1 and GK 2 along paths 502, 506. The gatekeeper GK 1 terminates the call by sending clearing messages to the endpoint Client 2 and exchanging DRQ/DCF messages with Clients 1 and 2. GK 1 also informs, along path 512, the bandwidth allocation manager 113 that it has released the bandwidth for the primary call and that the redundant allocation layer 115 can clear the GUId for the primary and secondary calls that used that GUId. The signaling channels 502, 504 for the primary call are then closed.

The endpoint Client 1 then takes the same actions with the gatekeeper GK 2 to clear the secondary call and the secondary signaling channels 506, 508 are closed. The redundancy supervisory layer 111a, 111b in each endpoint Client performs the termination function (and any related features) based on the clearing messages exchanged with gatekeepers GK 1 and GK 2.

If the gatekeeper GK 1 fails during the call, the signaling channels 502, 504 between the endpoints Client 1 and Client 2 are lost. The failure of the gatekeeper GK 1 is recognized at the endpoints and the bandwidth allocation manager, for example, as a TCP socket closing. As discussed above, according to the present invention, the voice channel 510 is maintained and the secondary signaling channels 506, 508 through the gatekeeper GK 2 are used. The bandwidth allocation manager's redundant allocation layer 115 recognizes the calls being handled by the gatekeeper GK 1 and which calls have redundant signaling being handled by the gatekeeper GK 2. If the gatekeeper GK 1 fails, the bandwidth allocation manager 115 frees up the bandwidth for the calls signaled through the gatekeeper GK 1 that do not have redundant signaling. While the gatekeeper GK 1 is out of service, any of the gatekeeper's endpoints that are equipped with the redundancy supervisory layers will no longer try to place calls to the gatekeeper GK 1, but will switch to use the gatekeeper GK 2 to place new calls. It is noted that more than two gatekeepers could be used. Thus, FIG. 5 is exemplary only.

Operation of this embodiment of the invention is illustrated more clearly with reference to the flowcharts of FIGS.

Figure 6A:
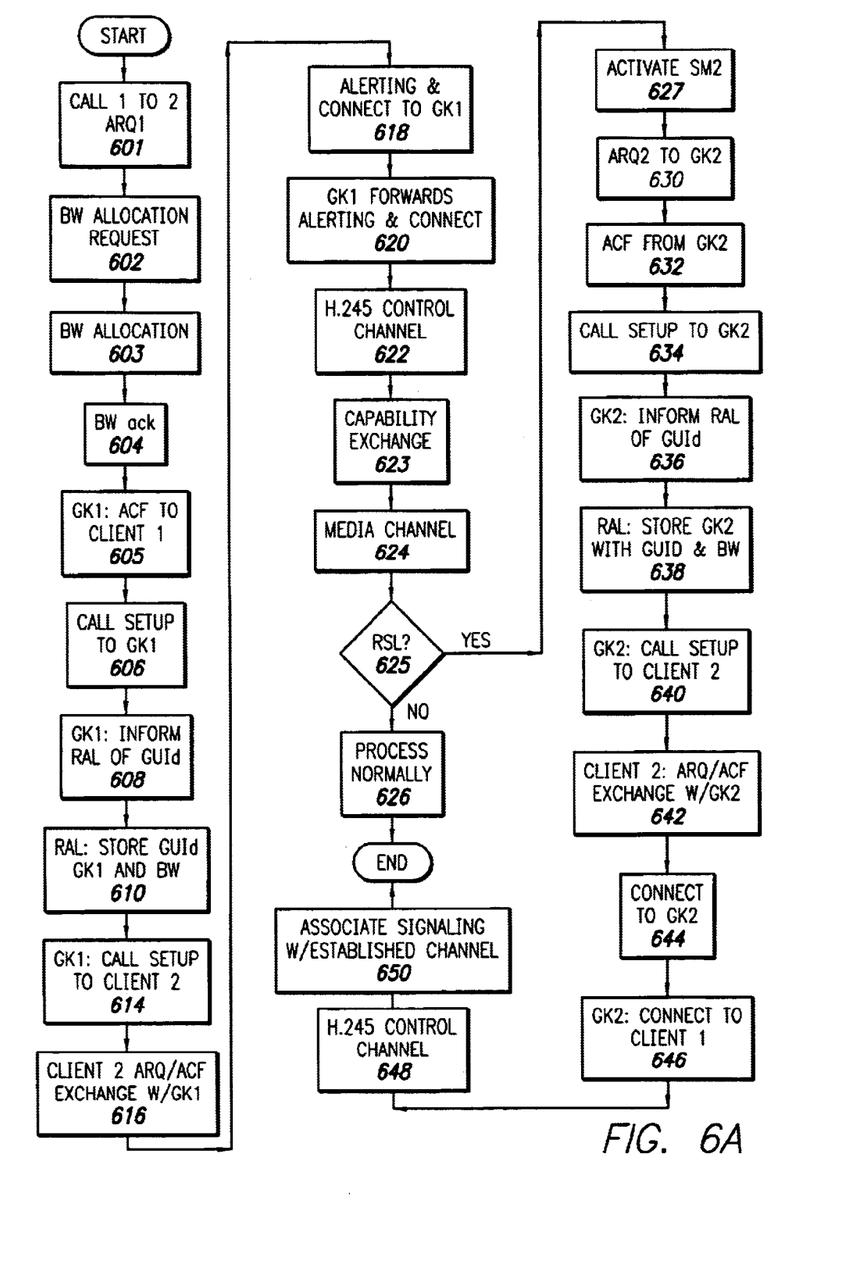
Figure 6B:
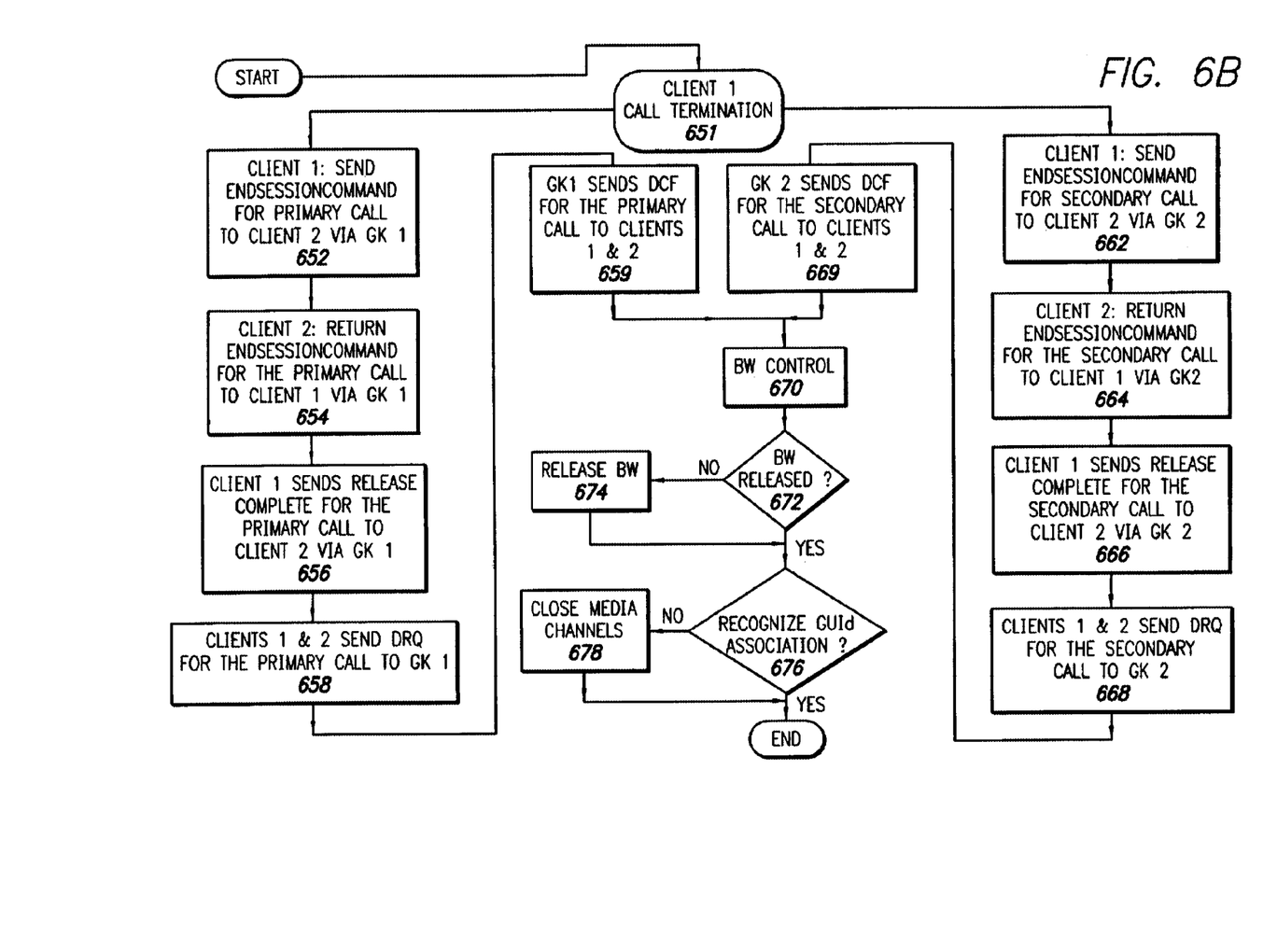

6A–6C. In particular, with reference to FIG. 6A, in a step 601, the endpoint Client 1 calls another endpoint, Client 2. The endpoint Client 1 and, particularly, the primary state machine 110a, sends an ARQ message (AdmissionRequest) to the gatekeeper GK 1. In a step 602, the gatekeeper GK 1 requests bandwidth from the bandwidth allocation manager 113. Assuming that the bandwidth is available, the bandwidth allocation manager 113 assigns the requested bandwidth, in a step 603. A bandwidth allocation acknowledgement is returned to gatekeeper GK 1 in a step 604. The gatekeeper GK 1 responds with an ACF (AdmissionConfirm) message confirming the bandwidth requested to the endpoint Client 1's primary state machine 110a, in a step 605. The ACF message includes a Call Signaling Transport Channel Address of the gatekeeper GK 1. In a step 606, in response to the ACF message, the primary state machine 110a sends an H225.0 Setup message to the gatekeeper GK 1, including a Globally Unique Call Identifier to identify the call. Gatekeeper GK 1 sends an indication of the primary call along with its GUId to the redundant allocation layer 115 of the bandwidth allocation manager 113 in a step 608. The redundant allocation layer 115 stores the GUId, its association to GK 1, and the bandwidth that is associated with the call in a step 610.

In a step 614, the gatekeeper GK 1 relays the H.225.0 Setup message to the endpoint Client 2's primary state machine 110c. In response, in a step 616, the endpoint Client 2's primary state machine 110c conducts an ARQ/ACF exchange with the gatekeeper GK 1. In a step 618, the endpoint Client 2's primary state machine 110c sends H.225.0 Alerting and Connect messages to the gatekeeper GK 1. The gatekeeper GK 1, in turn provides the Alerting and Connect messages to the endpoint Client 1's primary state machine 110a in a step 620. The Alerting or Connect message includes the H.245 Control Channel Transport Address, which is used, in a step 622, to establish the H.245 control channel. Next, an H.245 capability exchange is undertaken, in a step 623. The capability exchange may include exchange of coding algorithms to be used, and the like. In addition, according to the present invention, the capability exchange includes an exchange of whether each side is equipped with a redundancy supervisory layer 111, a determination which is made in a step 625. After the capability exchange the media channel(s) for the call is opened in a step 624. If one side is not equipped with a redundancy supervisory layer 111, then in a step 626, the system proceeds with normal call setup without redundancy, and the non-equipped side uses its only state machine as the "primary" state machine. In step 625, if it is established that both sides are equipped with a redundancy supervisory layer, then the primary state machine 110a sends a signal activating the secondary state machine 110b in a step 627.

In a step 630, the secondary state machine 110b sends an ARQ to the gatekeeper GK2 and since this is for a known secondary call, no bandwidth is requested. In a step 632, the secondary state machine 110b receives an ACF message from the gatekeeper GK 2, including the Call Signal Transport Channel Address of the gatekeeper GK 2. In a step 634, the secondary state machine 110b sends an H.225.0 Setup message to the gatekeeper GK 2, using the same globally unique call identifier that the primary state machine 110a used previously with the gatekeeper GK 1.

Gatekeeper GK 2 sends an indication of the secondary call and its GUId to the redundant allocation layer 115 in a step 636. In a step 638, the redundant allocation layer 115 stores the association of gatekeeper GK 2 with the GUId and with the bandwidth already associated for the primary call established through gatekeeper GK 1.

In a step 640, the gatekeeper GK 2 sends the H.225.0 Setup message to the endpoint Client 2, and particularly, the secondary state machine 110d, containing the same globally unique call identifier as the primary call established via GK 1. In a step 642, the endpoint Client 2's secondary state machine 110d and the gatekeeper GK 2 undertake the ARQ/ACF exchange (again, with no bandwidth being requested because this is known to be a secondary call). In a step 644, the endpoint Client 2's secondary state machine 110d sends a Connect message to the gatekeeper GK 2. This Connect message is forwarded by the gatekeeper GK 2 to the endpoint Client 1's secondary state machine 110b in a step 646. Next, in a step 648, the secondary state machine 110b of the endpoint Client 1 establishes the H.245 control channel with the endpoint Client 2's secondary state machine 110d. The Client 2 recognizes the duplicate nature of this second call and associates the new signaling and control channels with the existing media channel(s) without opening new media channel(s), in a step 650.

Turning now to FIG. 6B, a flowchart illustrating the termination process is shown. In a step 651, call termination is initiated at endpoint Client 1. It is noted that the call termination could be initiated from the endpoint Client 2 as well. In a step 652, the endpoint Client 1 (and, in particular, the state machine 110a), for example, initiates call termination by sending an H.245 endSessionCommand to gatekeeper GK 1, which sends the H.245 endSessionCommand on to endpoint Client 2. In a step 654, endpoint Client 2 (and, in particular, the state machine 110c) responds to the received H.245 endSessionCommand by sending its own H.245 endSessionCommand to GK 1, which sends the H.245 endSessionCommand on to endpoint Client 1. In a step 656, endpoint Client 1 sends an H.225.0 Release Complete message to gatekeeper GK 1 to close the call signaling channel, and GK 1 sends the Release Complete message on to endpoint Client 2. Endpoint Clients 1 and 2 then inform gatekeeper GK 1 to release the bandwidth for the primary call by sending Disengage Request (DRQ) messages to GK 1, in a step 658. In a step 659, gatekeeper GK 1 responds to the received DRQ messages by sending endpoint Clients 1 and 2 Disengage Confirm (DCF) messages.

Concurrently with closing the primary connection, the secondary connection also needs to be closed. In a step 662, the endpoint Client 1 (and, in particular, the state machine 1 10b) initiates call termination by sending an H.245 endSessionCommand to gatekeeper GK 2, which sends the H.245 endSessionCommand on to endpoint Client 2. In a step 664, endpoint Client 2 (and, in particular, the state machine 110d) responds to the received H.245 endSessionCommand by sending its own H.245 endSessionCommand to GK 2, which sends the H.245 endSessionCommand on to endpoint Client 1. In a step 666, endpoint Client 1 sends an H.225.0 Release Complete message to gatekeeper GK 2 to close the call signaling channel, and GK 2 sends the Release Complete message on to endpoint Client 2. Endpoint Clients 1 and 2 then inform gatekeeper GK 2 to release the control channel for the secondary call by sending Disengage Request (DRQ) messages to GK 2, in a step 668. In a step 669, gatekeeper GK 2 responds to the received DRQ messages by sending endpoint Clients 1 and 2 Disengage Confirm (DCF) messages.

The gatekeepers GK 1 and GK 2 further send a signal to the bandwidth allocation manager 113, indicating that the call is being terminated, and releasing the bandwidth, in a step 670. In a step 672, the bandwidth allocation manager 113 and, particularly, the redundant allocation layer 115 checks to see if the bandwidth associated with the GUId has already been released. If not, then in a step 674, the bandwidth is released. Next, in a step 676, the redundancy supervisory layers 111*a* and 111*b* determine whether the GUId is recognized as belonging to an already closed connection. If it is, then no additional action is taken, other than to close the signaling. However, if it is not recognized as associated with an already closed media channel, then the media channel is closed, in a step 678, and the signaling channel is closed as well.

Turning now to FIG. 6C, a diagram illustrating operation of the bandwidth allocation manager 113 and the associated redundant allocation layer 115 in the event of gatekeeper failure is shown. In particular, in a step 680, the gatekeeper GK 1 fails. It is noted that failure of the gatekeeper GK 1 is by way of example only. The present invention is equally applicable to failure of gatekeeper GK 2. Next, in a step 682, the bandwidth allocation manager 113 detects the failure of the gatekeeper GK 1, typically as a closed TCP socket. In response, in step 684, the bandwidth allocation manager 113's redundant allocation layer 115 checks to determine whether a secondary call on another gatekeeper exists (primary or secondary), for example, by identifying calls with the same globally unique call identifier assigned to both GK 1 and to another gatekeeper, for example, GK 2. If so, then in a step 686, the bandwidth allocation manager 113 keeps the reserved bandwidth for the other gatekeeper, but removes GK 1 from the stored entry. If not, then in a step 688, the bandwidth assigned only to the GK 1 call is released.

What is claimed is:

1. An H.323 client terminal, comprising:
    a first H.323 controller in said H.323 client terminal configured to handle call and control signaling during a media communication with another H.323 client terminal via a first gatekeeper;
    a second H.323 controller in said H.323 client terminal configured to handle call and control signaling via a second gatekeeper;
    wherein said second H.323 controller provides redundant H.323 call and control signaling for said media connection while said first H.323 controller provides call and control signaling for said media connection via said first gatekeeper, and said second H.323 controller provides H.323 call and control signaling for said media connection via said second gatekeeper if said first gatekeeper fails.

2. An H.323 client terminal, in accordance with claim 1, wherein said first H.323 controller and said second H.323 controller are configured to provide the same globally unique call identifier (GUId) to said first and second gatekeepers.

3. An H.323 client terminal, in accordance with claim 1, wherein said first H.323 controller and said second H.323 controller are configured to provide a globally unique call identifier (GUId) to said second gatekeeper that is different but can be associated in a known way from a globally unique call identifier presented to said first gatekeeper.

4. A communications client terminal for use in a network having separate signaling and media channels, comprising:
    a first controller in said communications client terminal configured to handle call signaling during a media communication with another client terminal via a first gatekeeper;
    a second controller in said communications client terminal configured to handle call signaling with a second gatekeeper;
    wherein said second controller provides redundant signaling for said media connection while said first controller provides call signaling for said media connection via said first gatekeeper, and said second controller provides call signaling for said media connection via said second gatekeeper if said first gatekeeper fails.

5. A communications client terminal, in accordance with claim 4, wherein said first controller and said second controller are configured to provide the same unique call identifier to said first and second gatekeeper.

6. A communications client terminal, in accordance with claim 4, wherein said first controller and said second controller are configured to provide a unique call identifier to said second gatekeeper that is different but can be associated in a know way from a unique call identifier presented to said first gatekeeper.

7. A telecommunications system, having separate media and signaling channels, comprising:
    a packet-switched network;
    a plurality of client terminals coupled to said packet switched network; a plurality of gatekeepers coupled to said packet switched network;
    wherein the plurality of client terminals are configured to request establishing primary signaling connections with one another via a first of said plurality of gatekeepers, and request establishing redundant signaling connections with one another via a second of said plurality of gatekeepers while maintaining a single media connection such that if said primary gatekeeper fails, said media connection is maintained with said redundant signaling connection.

8. A telecommunications system according to claim 7, further comprising:
    a bandwidth allocation manager coupled to said packet-switched network, said bandwidth configured to receive bandwidth allocation requests from said first and second gatekeepers, and allocate bandwidth for said media connection in response to a request from said first gatekeeper and to associate a second call from said second gatekeeper with this same bandwidth that was allocated to the first gatekeeper call.

9. A telecommunications system according to claim 8, said bandwidth allocation manager configured to release said bandwidth only once in response to a closure of both said primary and said redundant signaling.

10. A telecommunications system according to claim 7, further comprising:
    means for identifying primary and secondary calls and associating a function with a primary call but not a secondary call.

11. A telecommunications system according to claim 7, wherein a predetermined number less than a total number of said plurality of said client terminals are equipped to establish said primary and redundant signaling connections.

12. A telecommunications system according to claim 7, wherein said first of said plurality of gatekeepers operates under a first operating system and said second of said plurality of gatekeepers operates under a second operating system.

13. A method for providing a telecommunications system, having separate media and signaling channels, comprising:
    providing a packet-switched network;
    providing a plurality of client terminals coupled to said packet switched network;
    providing a plurality of gatekeepers coupled to said packet switched network;

wherein the plurality of client terminals are configured to request establishing primary signaling connections with one another via a first of said plurality of gatekeepers, and request establishing redundant signaling connections with one another via a second of said plurality of gatekeepers while maintaining a single media connection such that if said primary gatekeeper fails, said media connection is maintained with said redundant signaling connection.

14. A method according to claim 13, further comprising:
providing a bandwidth allocation manager coupled to said packet-switched network, said bandwidth allocation manager configured to receive bandwidth allocation requests from said first and second gatekeepers, and allocate bandwidth for said media connection in response to a request from said first gatekeeper and to associate a second call from said second gatekeeper with this same bandwidth that was allocated to the first gatekeeper call.

15. A method according to claim 14, said bandwidth allocation manager configured to release said bandwidth only once in response to a closure of both said primary and said redundant signaling.

16. A telecommunications system according to claim 13, further comprising:
providing a server coupled to said packet-switched network, said server configured to receive function requests from said first and second gatekeepers based on a number of signaling channels, and perform said function based on establishment of said media connection in response to a request from said first gatekeeper but not said second gatekeeper.

17. A method according to claim 13, wherein a predetermined number less than a total number of said plurality of said client terminals are equipped to establish said primary and redundant signaling connections.

18. A method according to claim 13, wherein said first of said plurality of gatekeepers operates under a first operating system and said second of said plurality of gatekeepers operates under a second operating system.

19. A telecommunications method, comprising:
establishing primary signaling connections among a plurality of client terminals via a first of a plurality of gatekeepers responsive to request from at least one of said plurality of client terminals,
establishing redundant signaling connections among said plurality of client terminals via a second of said plurality of gatekeepers responsive to a request from a client terminal that requested a primary signaling connection; and
maintaining a single media connection such that if said primary gatekeeper fails, said media connection is maintained with said redundant signaling connection.

20. A telecommunications method in accordance with claim 19, further comprising
receiving bandwidth allocation requests at a bandwidth allocation manager from said first and second gatekeepers, and
allocating bandwidth for said media connection in response to a request from said first gatekeeper and to associate a second call from said second gatekeeper with this same bandwidth that was allocated to the first gatekeeper call.

21. A telecommunications method in accordance with claim 20 further comprising releasing said bandwidth only once in response to a closure of both said primary and said redundant signaling.

22. An H.323 client terminal, comprising:
a first H.323 controller configured to provide primary call and control signaling during a media communication with another H.323 client terminal via a first gatekeeper;
a second H.323 controller configured to provide redundant call and control signaling concurrently during said media communication via a second gatekeeper;
wherein said second H.323 controller is activated to provide primary call control and signaling via said second gatekeeper if said first gatekeeper fails.

23. A telecommunications system, having separate media and signaling channels, comprising:
a packet-switched network;
a plurality of client terminals coupled to said packet switched network;
a plurality of gatekeepers coupled to said packet switched network;
wherein the plurality of client terminals are configured to establish primary signaling connections with one another via a first of said plurality of gatekeepers, and redundant signaling connections with one another via a second of said plurality of gatekeepers while maintaining a single media connection such that if said primary gatekeeper fails, said media connection is maintained with said redundant signaling connection;
wherein said redundant signaling connections comprise a requesting one of said plurality of client terminals opening said redundant signaling connection responsive to initially establishing said primary signaling connection.

* * * * *